United States Patent [19]
Hotchkiss et al.

[11] 4,043,622
[45] Aug. 23, 1977

[54] BEARING ASSEMBLY

[75] Inventors: John Devlin Hotchkiss; William Henry Hotchkiss, both of Swanley Village, England

[73] Assignee: John D. Hotchkiss Limited, England

[21] Appl. No.: 609,904

[22] Filed: Sept. 3, 1975

[30] Foreign Application Priority Data
Sept. 13, 1974 United Kingdom ............... 40017/74

[51] Int. Cl.² ............................................. F16C 19/00
[52] U.S. Cl. .................... 308/208; 29/116 R
[58] Field of Search .......................... 308/15, 20, 208; 29/110, 116 R

[56] References Cited
U.S. PATENT DOCUMENTS

| 2,032,490 | 3/1936 | Moore ................................ 308/20 X |
| 3,037,557 | 6/1962 | Faeber et al. ...................... 29/116 R |
| 3,512,475 | 5/1970 | Justus et al. ................... 29/116 R X |

Primary Examiner—Joseph F. Peters, Jr.
Assistant Examiner—Gene A. Church
Attorney, Agent, or Firm—Diller, Brown, Ramik & Wight

[57] ABSTRACT

This disclosure relates to a bearing assembly for large rolls, particularly rolls utilized in the paper making industry wherein the end portions of the rolls are tubular to define sockets and inserted in each socket is a sleeve which is particularly configurated to have a housing fixedly fitted therein, the sleeve and housing having axially spaced contacting surfaces and the housing carrying axially spaced bearings with the bearings journalling the housing on the stub shaft. The construction is such that with a roll blocked in place, the housing, complete with bearings and stub shaft, can be removed as a unit from the sleeve facilitating quick and easy replacement.

11 Claims, 2 Drawing Figures

BEARING ASSEMBLY

This invention relates to a bearing assembly, especially to bearing assemblies for mounting a rotating roll on twin static spindles.

The invention is particularly, but not exclusively, useful in the papermaking industry for mounting any roll, such as those used for carrying felts, especially those woven from synthethic material which by virtue of its composition has little or no elasticity and which require up to 90% more tension to enable them to be run on a paper machine than the traditional woollen or cotton woven felts which they are designed to replace. The synthetic felt and fabrics can differ from the traditional woollen or cotton woven felts, in having little or no stretch which thereby imparts a greater load onto the journals of conventionally contructed felt-rolls, such for the example fractures may occur at the journal neck, and bearings are more prone to seize up due to the bearings on a conventional roll being of necessity smaller than are proposed in the invention.

When a conventionally designed bearing fails under stress, further damage is commonly occasioned to the bearings themselves, the journals and also to the bearing housing. Additionally, the roll and/or its end may drop suddenly and fall onto the moving felt which it is designed to support (or onto adjacent machinery) thus causing further damage and expense.

The use of stronger bearings does not necessarily prevent the tendency for the spindle to fracture at the spindle neck where it enters the body of the shell or roll, because such breakages and failures described above are a consequence of the cumulative effects of the low-stretch properties of the open-weave felt, and the properties inherent in conventional rolls as eccentricities in the roll faces themselves which together create a tendency to induce oscillating and variable streses on the rotating spindle. These forces result in rapid metal fatigue at the roll neck, since they impart a varying radial bending moment on the journal as it rotates.

When such a failure occurs, not only is it commonly very sudden, but also the paper machine must be stopped immediately so that the entire roll (which may be up to 25 feet long) can be removed and a complete spare roll (and possibly also bearings and bearing-housing) can be replaced. This involves partial dismantling of the machine and destruction of the felt. In the paper making environment, lost or downtime is a very costly consideration. A further disadvantage of the convention design of roll-mounting is that it is difficult to increase the physical size of the bearings (and thus the spindles) due to the limitations imposed by dimension of the paper making machine on which it is mounted.

We have invented a new method of mounting load-bearing rotating rolls, which may be either solid or hollow, such that the roll itself is caused to rotate on bearings that run on a static spindle.

According to the invention, a bearing assembly for a roll comprises a bearing unit for a roll, the bearing unit comprising a housing which is adapted to be received in a recess in an end of said roll, a pair of bearings fitted within said housing and a stub shaft supported by said bearings and extending beyond the end of said roll for support by a bracket or gab.

Preferably the housing is detachably secured in a socket fitted in said recess. The socket is suitably a sleeve secured in the roll end, the housing being a tight sliding fit (or force fit) in the sleeve. Preferably both the sleeve and the housing are stepped so that, when the housing is fully home in the sleeve, both ends of the housing are tightly fitted and a section of the housing intermediate its ends is spaced from the sleeve.

Each bearing may be a race having two sets of canted rollers. A cover plate may be fitted to each end of the roll to act as a lubricant seal.

In a preferred embodiment, the roll is hollow and is perforate along its length, each stub shaft also being hollow to allow heated air or steam to be passed into the roll which then exits from the perforations. Preferably, each stub shaft supports a coaxial tube having a circular disc-shaped baffle fixed to its inner end. The tubes are axially slidable to adjust the positions of the baffles to direct the heated air or steam to predetermined sections of the roll in accordance with a moisture profile measured across a web passing over the roll.

When the stub shaft is supported in a bracket or gab, the distance between the centres of the bearings is preferably greater than the distance between the centre of the outermost bearing and the centre of the bracket or gab. This spacing provides a more even load distribution along the length of the stub shaft which reduces the risk of bearing failure and improves resistance to roll deflection, particularly when the roll is subjected to high web tension.

The stub shaft which passes through the axis of the housing may be substantially greater in diameter than is possible with conventional designs, and thus may be made very much stronger.

The new construction is also such that the longitudinal distances between the centres of the bearings themselves can be considerably reduced which, taken in conjunction with the larger diameter stub shafts, greatly reduces or eliminates stresses imparted to the journals induced by externally imposed bending moments. Any such stresses are constrained to be unidirectional which considerably reduces the risk of inducing metal-fatigue, failures and breakages of the stub shaft. Moreover, the load is spread over the entire distance between the stub shaft mounting or gab and the centre of the rear bearing inside the roll compared with a conventional rotating stub shaft wherein the stress is concentrated at the roll neck.

A preferred embodiment of the invention is now described with reference to the accompanying drawings, in which.

Figure 1:
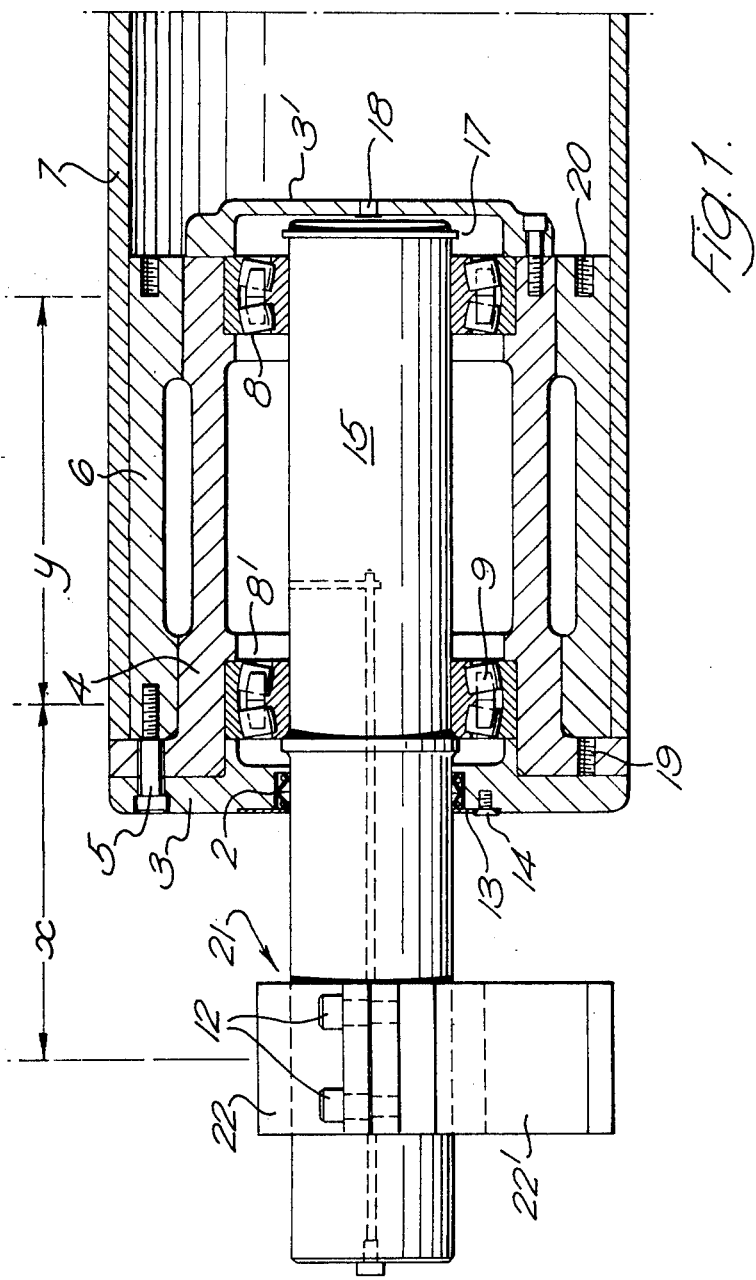
FIG. 1 is a schematic cross-section of a bearing assembly on a roll.

Referring to the drawings, there is shown one end of a roll 7 which may be hollow or solid and which has at each end a socket for receiving a bearing assembly. In the case of a solid roll, a separate socket is not necessary, but in the illustrated construction, the socket is of reduced internal diameter and formed by a sleeve 6 which is set into the end of the roll. The sleeve 6 is fast in the roll 7 and is welded or otherwise secured to the end of the roll. For the purpose of illustration, the sleeve 6 is a shrink fit. The sleeve 6 is counterbored, the inner end being of a smaller bore than the outer end, with an intermediate portion cut away.

A bearing assembly is arranged within a housing 4 which is a snug sliding fit within the sleeve 6. The outer cylindrical surface of the housing 4 is stepped so that the innermost and smaller end of the housing fits closely within the inner end of the sleeve 6 and the outermost end of the housing 4 fits within the outer end of the sleeve 6, a central portion again being cut away. This arrangement means that after the housing has been partly removed from the sleeve, for example by mechanical means, the bearing assembly can then readily be slid out by hand. The inner end of the housing 4 is closed off by a rounded off rear cover 2' which facilitates entry of the housing into the inner end of the sleeve 6.

Located within the housing 4 are inner and outer bearings, 8 and 8' respectively, each of which are races containing two sets of canted rollers 9. Shoulders are machined in the bore of the housing 4 to give positive location to the two races. The bearings outer tracks are held in place by covers 3 and 3'. Cover 3' completely seals the rear of the assembly and carries a pressure relief valve 18. Cover 3 carries lip seals 2 which bear against a stub shaft 14 and are provided for retaining lubricant and for excluding foreign matter. Cover 3 and the complete assembly are held in position by screws 5. Stub shaft 15 extends through seals 2 in the cover 3 and is received within the bearings 8 and 8'. The stub shaft 15 extends outwardly from roll 7 and is prevented from complete withdrawal by a circlip 17. The seals 2 are retained by covers 13 and set screws 14. Seals 2 can be replaced as necessary merely by removal of set screws 14 and plate 13 without any further dismantling.

19 is a tapped hole for removing the cartridge from its socket. 20 is the tapped hole at rear of socket by which to attach balance weights should they be necessary.

An identical arrangement is provided at the other end of the roll 7 which is thus rotatable relative to two fixed stub shafts 15.

The stub shafts 15 are supported in respective brackets or gabs 21, which comprises for example, U-shaped clamping members 22 and 22' secured by screws 12. Preferably, the distance x between the centre of bracket or bag 21 and the centre of the outer bearing 8' is less than the distance y between the centres of the inner and outer bearings 8 and 8'. This spacing provides a more even load distribution along the length of the stationary stub shaft as compared with a roll having an integral stub shaft which rotates in a journal. The latter type of roll is subject to fatigue at the journal which can lead to a bearing failure or stub fracture. Brackets or gabs 21 may be supported in a roll stand (not shown).

Figure 2:
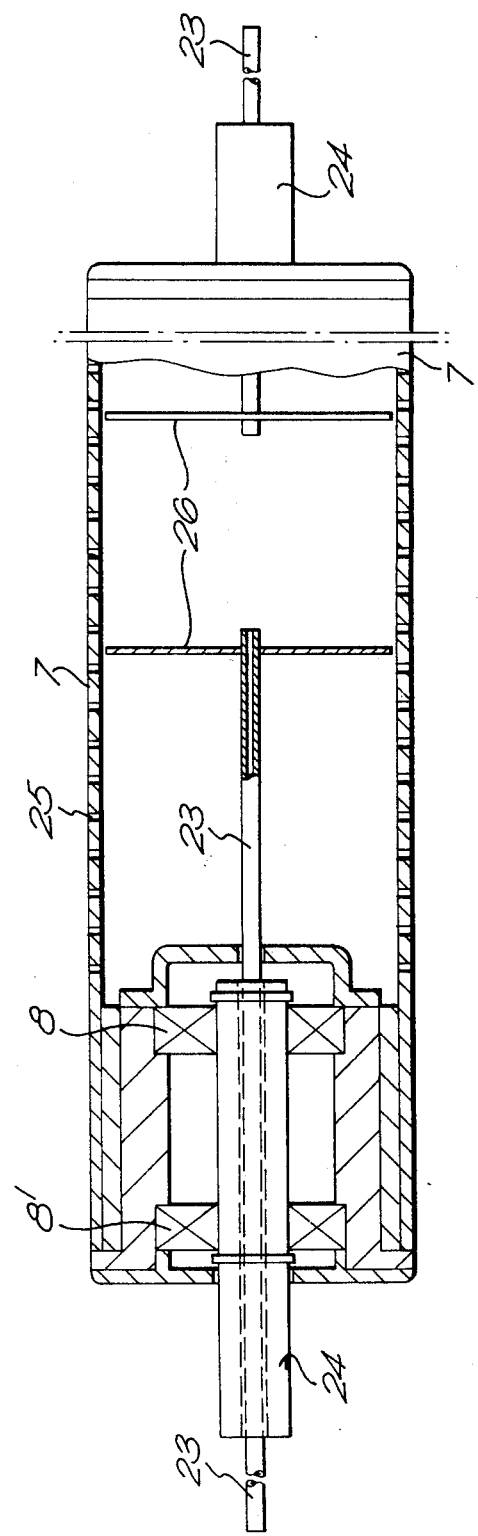
FIG. 2 is a further schematic cross-section of the roll showing adjustable baffles therein.

Referring to FIG. 2, which shows the roll 7 in partial longitudinal cross-section, a tube 23 may be coaxially located in each hollow stub shaft 24 to supply heated air or steam to the interior of the roll 7. The roll 7 is perforate along its length, as shown by holes 25, to allow the heated air or steam to escape. Circular disc-shaped baffles 26 are attached to the inner end of each tube 23 so as to direct the heated air or steam to different sections of the roll 7. The tubes 23 are axially slidable, either manually, or automatically in accordance with a moisture profile measured across a web carried by roll 7 or a web rotating in contact with the latter web. For example, roll 7 may support a paper web or a drying web which bears on a paper web. This enables a more even content to be obtained across the paper web.

In the event of the newly designed roll-mounting undergoing excessive stressing resulting in bearing-failure, the fault will gradually become apparent (unlike the sudden failure of conventional roll-mountings) by reason of visable and/or audible vibrations, thus allowing adequate time for preparations to be made to remove the complete bearing assembly from the roll-end in the following manner:

1. Having stopped the paper (or other) machine, the body of the roll is suitable supported
2. The u-bolts or gab 1 or appropriate fastenings holding stub shaft 15 to the frame are released and removed
3. Set screws 5 and cover 3 are removed
4. Set screws 5 are inserted into tapped holes 19 provided in the housing flange
5. The bearing housing 4 is jacked out, typically a distance of some 5 cm. This action completely frees the bearing assembly thus allowing the complete unit comprising spindle bearings and bearing-housing to be withdrawn from the end of the roll, which itself remains in situ on the paper (or other) machine.
6. The complete replacement assembly is slid into position in the roll end until the bearing areas make contact. Set screws 5 are inserted and the whole assembly is drawn into its working position.
7. The holes in the bearing cover and in the housing flange are aligned with tapped holes in the roll end and the holding down bolts are located and tightened, thus pulling the housing 4 into its working position.
8. The u-bolts, gab or other mounting, of the stub shaft 15 are re-secured, and having removed the chocks or other supports that have been supporting the roll during the operation the machine is ready to run. The invention can thus provide the following advantages:

1. The replacement of a worn or damaged assembly does not require heavy lifting tackle, nor access to an especially long lathe.
2. All repair work to the damaged bearing assembly can be done as and when convenient, on small workshop equipment.
3. It is impossible to mis-align the bearings no matter how the roll is mounted or mis-aligned.
4. Since the only practical limitation on the size of the bearings is imposed by the dimensions of the roll itself, larger (and therefore stronger) bearings and stub shafts can be employed.
5. It is necessary only to hold unit-assemblies (spindle, bearings and housing) in the stores, rather than complete rolls.
6. Existing rolls of conventional design can readily be converted to the new design by employing conventional engineering techniques.
7. The new design results in a minimal increase if any, in the total weight of the roll and its bearings.
8. The cover on the ends of the roll protect the internal assembly from the ingress of dirt, moisture or other wear-inducing contraries of foreign matter including corrosives.
9. A roll supported on the new design of mounting can be positioned in the most advantageous position on the paper machine with respect to other rolls, which is difficult if not impossible with conventional rolls.
10. The bearing assembly can be pre-packed for its useful working life with a lubricant and provision can be made, for example, by means of a suitably located grease-nipple 10 to inject fresh lubricant via channel 11, if necessary, whilst the roll is rotating.
11. Extra stability can be given to the paper machine framing by fitting a wider gab 1.

12. The whole assembly can be so arranged that it can be fitted into existing gabs on a paper or other machine.

What we claim is:

1. A bearing unit for a roll, said bearing unit comprising a cylindrical sleeve, a cylindrical housing received in said sleeve, a pair of spaced bearing assembles received in said housing and a stub shaft supported by said bearing assemblies; said housing and said sleeve having first and second end portions spaced by a mid-portion, the internal diameter of said first end portion of said sleeve being smaller than the internal diameter of said second end portion of said sleeve, the internal diameter of said mid-portion of said sleeve being larger than the internal diameter of said first end portion of said sleeve, the external diameter of said first and second end portions of said housing being such as to ensure a tight fit in the respective first and second end portions of said sleeve, and the external diameter of said mid-portion of said housing being smaller than the external diameter of said first end portion of said housing, said bearing assemblies being respectively fitted within said first and second end portions of the housing with said stub shaft extending beyond the bearing assembly in said second end portion of said housing.

2. A bearing unit according to claim 1 wherein the second end portion of said housing defines a flange, and a cover plate is secured to said flange and said sleeve by fasteners passing through said cover plate and said flange and threadably received in said sleeve.

3. A bearing unit according to claim 2 wherein each of said bearing assemblies includes at least an outer race containing sets of canted rollers, said outer races being located in respective recesses in said housing.

4. A bearing unit according to claim 2 wherein said flange has smooth wall bores receiving said fasteners, and threaded bores opposing an adjacent end of said sleeve for receiving housing removing threaded jacking members.

5. A bearing unit according to claim 2 wherein said housing has inner annular recesses at opposite ends thereof receiving said bearing assemblies, said recesses opening out through opposite ends of said housing, and a cover at each end of said housing engaging respective ones of said bearing assemblies and positioning said bearing assemblies axially within said housing.

6. A roll assembly comprising a roll member having tubular end portions, a bearing unit removably fitted at each end of said roll member, each bearing unit comprising a cylindrical sleeve fixedly secured in a respective end of said roll member, a cylindrical housing received in said sleeve, a pair of spaced bearing assemblies received in said housing and a stub shaft supported by said bearing assemblies; said housing and said sleeve having first and second end portions spaced by a mid-portion, the internal diameter of said first end portion of said sleeve being smaller than the internal diameter of said second end portion of said sleeve, the internal diameter of said mid-portion of said sleeve being larger than the internal diameter of said first end portion of said sleeve, the external diameter of said first and second end portions of said housing being such as to ensure a tight fit in the respective first and second end portions of said sleeve, and the external diameter of said mid-portion of said housing being smaller than the external diameter of said first end portion of said housing, said bearing assemblies being respectively fitted within said first and second end portions of the housing with said stub shaft extending beyond the bearing assembly in said second end portion of said housing.

7. A roll assembly according to claim 6 wherein, in each of said bearing units, said second end portion of said housing defines a flange, and a cover plate is secured to said flange and said sleeve by fasteners passing through said cover plate and said flange and threadably received in said sleeve.

8. A roll assembly according to claim 7 wherein in each bearing unit said bearing assemblies include outer races containing sets of canted rollers, said outer races being located in respective recesses in said housing.

9. A roll assembly according to claim 7 wherein said stub shafts of said roll are supported in respective brackets in a roll stand, the distance between the centers of the bearing assemblies in each of said bearing units being greater than the distance between the center of the outermost bearing and the center of the respective adjacent bracket.

10. A roll assembly according to claim 9 wherein said roll assembly is particularly adapted for use in the making of paper and is hollow throughout its length, said roll member having perforations along its length, a plurality of axially adjustable baffles within said roll member, and support members adjustable passing through the respective stub shafts supporting said baffles.

11. A roll assembly according to claim 7 wherein each flange has smooth wall bores receiving said fasteners, and threaded bores opposing an adjacent end of a respective sleeve for receiving housing removing threaded jacking members.

* * * * *